US009432705B2

(12) United States Patent
Suh et al.

(10) Patent No.: US 9,432,705 B2
(45) Date of Patent: Aug. 30, 2016

(54) APPARATUS FOR TRANSMITTING VIDEO STREAM, APPARATUS FOR RECEIVING VIDEO STREAM, METHOD FOR TRANSMITTING VIDEO STREAM, AND METHOD FOR RECEIVING VIDEO STREAM

(71) Applicant: LG ELECTRONICS INC., Seoul (KR)

(72) Inventors: Jongyeul Suh, Seoul (KR); Kookyeon Kwak, Seoul (KR); Jinpil Kim, Seoul (KR); Jeehyun Choe, Seoul (KR); Hotaek Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/803,990

(22) Filed: Jul. 20, 2015

(65) Prior Publication Data
US 2015/0326895 A1 Nov. 12, 2015

Related U.S. Application Data

(63) Continuation of application No. 14/234,593, filed as application No. PCT/KR2012/005887 on Jul. 24, 2012, now Pat. No. 9,113,020.

(60) Provisional application No. 61/511,559, filed on Jul. 26, 2011.

(51) Int. Cl.
*H04N 5/38* (2006.01)
*H04N 21/2343* (2011.01)
(Continued)

(52) U.S. Cl.
CPC .... *H04N 21/234309* (2013.01); *H04N 7/0125* (2013.01); *H04N 7/12* (2013.01);
(Continued)

(58) Field of Classification Search
CPC .. H04N 7/0125; H04N 7/12; H04N 21/2362; H04N 21/23614; H04N 21/234363; H04N 21/4348; H04N 21/845; H04N 19/40; H04N 19/59
USPC ......... 348/723, 441, 725, 726, 218.1, 385.1, 348/387.1, 426.1–428.1, 430.1, 715
See application file for complete search history.

(56) References Cited

U.S. PATENT DOCUMENTS 8,243,824 B2 * 8/2012 Araki ................... H04N 19/176
375/240.1
8,421,915 B2 4/2013 Yamashita
(Continued)

FOREIGN PATENT DOCUMENTS

| EP | 2288170 A2 | 2/2011 |
| JP | 08046960 | 2/1996 |
| KR | 10-2009-0089960 | 8/2009 |
| KR | 10-2010-0038694 | 4/2010 |
| KR | 10-2010-0071690 A | 6/2010 |

(Continued)

Primary Examiner — Trang U Tran
(74) Attorney, Agent, or Firm — Dentons US LLP

(57) ABSTRACT

The present invention provides an apparatus for transmitting a video stream, an apparatus for receiving a video stream, a method for transmitting a video stream, and a method for receiving a video stream. One embodiment of the present invention, discloses the method for transmitting the video stream, comprising the steps of: down-sampling a UHD (ultra high definition) video stream to divide the UHD video stream into a sub-stream of a viewable HD compatible video, a sub-stream of an HD-sized video, and a sub-stream of a residual signal as a difference between the HD compatible video and the HD-sized video, and encoding the divided sub-streams; multiplexing signaling information for describing the relationship between the UHD video stream and at least one sub-stream and including the sub-stream; and transmitting the multiplexed HD sub-stream and the signaling information.

8 Claims, 19 Drawing Sheets

(51) Int. Cl.
- *H04N 21/845* (2011.01)
- *H04N 7/01* (2006.01)
- *H04N 21/236* (2011.01)
- *H04N 21/434* (2011.01)
- *H04N 21/2362* (2011.01)
- *H04N 7/12* (2006.01)
- *H04N 19/40* (2014.01)
- *H04N 19/59* (2014.01)

(52) U.S. Cl.
CPC ... *H04N 21/2362* (2013.01); *H04N 21/23614* (2013.01); *H04N 21/234363* (2013.01); *H04N 21/4348* (2013.01); *H04N 21/845* (2013.01); *H04N 21/8451* (2013.01); *H04N 19/40* (2014.11); *H04N 19/59* (2014.11)

(56) References Cited

U.S. PATENT DOCUMENTS

| | | |
|---|---|---|
| 2006/0130113 A1 | 6/2006 | Carlucci et al. |
| 2007/0133950 A1* | 6/2007 | Yoshida ............... G11B 27/034 386/220 |
| 2009/0028192 A1 | 1/2009 | Rieger et al. |
| 2010/0142836 A1 | 6/2010 | Joshi et al. |
| 2011/0032422 A1* | 2/2011 | Yamamoto ............ G06T 3/4053 348/500 |
| 2013/0167184 A1 | 6/2013 | Hong et al. |

FOREIGN PATENT DOCUMENTS

| | | |
|---|---|---|
| WO | 2010-117129 A2 | 10/2010 |
| WO | 2010-126227 A2 | 11/2010 |
| WO | 2011-028024 A2 | 3/2011 |

* cited by examiner

FIG. 7

| Syntax | No. of bits | Mnemonic |
|---|---|---|
| TS_program_map_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for (i=0; i<N; i++) { | | |
|         descriptor()  → UHDTV_service_combine_descriptor() | | |
|     } | | |
|     for (i=0; i<N; i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for (i=0; i<N2; i++) { | | |
|             descriptor()  → UHDTV_sub_stream_descriptor() | | |
|         } | | |
|     } | | |
|     CRC_32 | 32 | rpchof |
| } | | |

FIG. 8

| Syntax | No. of bits | Format |
|---|---|---|
| UHDTV_sub_stream_descriptor ( ) { | | |
|     descriptor_tag | 8 | uimsbf |
|     descriptor_length | 8 | uimsbf |
|     sub_stream_ID | 16 | uimsbf |
|     sub_stream_type | 8 | uimsbf |
|     sub_video_grid_hor | 4 | uimsbf |
|     sub_video_grid_ver | 4 | uimsbf |
|     if (sub_stream_type=0x01 \|\| sub_stream_type=0x03) { | | |
|         residual_sub_stream_ID | 16 | uimsbf |
|     } | | |
|     if (sub_stream_type=0x04) { | | |
|         associated_sub_stream_ID | 16 | uimsbf |
|     } | | |
| } | | |

FIG. 9

| sub_stream_type | Meaning |
|---|---|
| 0x00 | HD compatible, complete sub-video component (configuring a sub-video. Complete sub-video can be acquired when the element is decoded and can be viewed through the HD receiver.) |
| 0x01 | HD compatible video component, complete sub-video (configuring a sub-video. Additional delta signal is needed for reconstruction of UHD video. The stream can be combined with the delta signal into a video viewable through HD receiver.) |
| 0x02 | Non-HD compatible, complete sub-video component (Complete sub-video can be acquired when the element is decoded. However, exclusively outputting the stream to view the video is not recommended.) |
| 0x03 | Non-HD compatible video component, complete sub-video (The stream can be combined with a delta signal into a sub-video of UHD video, but exclusively outputting the result of combination to view the video is not recommended.) |
| 0x04 | Residual signal for sub-video component (Signal provided as delta signal for other sub-video component to output UHD video.) |
| 0x05 | Stream configured with multiple sub-videos |
| 0x06 | Compatible with 3840 x 2160 (4K UHDTV) |
| 0x07 ~ 0xFF | Reserved |

FIG. 11

| Syntax | No. of bits | Format |
|---|---|---|
| UHDTV_service_combine_descriptor ( ) { | | |
|     descriptor_tag | 8 | uimsbf |
|     descriptor_length | 8 | uimsbf |
|     original_UHD_resolution | 2 | uimsbf |
|     UHD_sub_service_type | 3 | uimsbf |
|     reserved | 3 | '111' |
|     num_linked_media | 8 | uimsbf |
|     for (i=0; i<num_linked_media; i++) { | | |
|         linked_media_type | 2 | uimsbf |
|         linked_media_sync_type | 3 | uimsbf |
|         reserved | 3 | '111' |
|         if (linked_media_type == 0) { | | |
|             reserved | 5 | '11111' |
|             linked_UHD_sub_service_type | 3 | uimsbf |
|             associated_program_TSID | 16 | uimsbf |
|             associated_service_original_network_id | 16 | uimsbf |
|             associated_service_id | 16 | uimsbf |
|         } | | |
|         else if (linked_media_type == 1) { | | |
|             reserved | 5 | '11111' |
|             linked_UHD_sub_service_type | 3 | uimsbf |
|             internet_linkage_information () | | |
|         } | | |
|     } | | |
| } | | |

FIG. 12

| UHD_sub_service_type | Meaning |
|---|---|
| 000 | Current service does not include a stream which can be exclusively output (Only non-compatible streams are present. Additional data needs to be received through another service or medium in addition to the data provided from the current service) |
| 001 | An HD compatible stream is included in the current UHD service, but a 4K UHD or 8K UHD service is not exclusively supportable. UHD broadcast can be supported only when additional data is received through another service or medium in addition to the data provided from the current service. |
| 010 | A 4K UHD compatible stream is included in the current UHD service, but a HD or 8K UHD service is not exclusively supportable. UHD broadcast can be supported only when additional data is received through another service or medium in addition to the data provided from the current service. |
| 011 | All streams needed to support the original UHD broadcast are included in the current UHD service (original UHD broadcast refers to a UHD broadcast corresponding to the value of the original_UHD_resolution). |
| 100 | Reserved |
| 101 | Reserved |
| 110 | Reserved |
| 111 | Reserved |

FIG. 13

| UHD_resolution | |
|---|---|
| 00 | 3840 x 2160 (4K-UHDTV) |
| 01 | 7680 x 4320 (8K-HUDTV) |
| 10 | reserved |
| 11 | reserved |

FIG. 14

| Field | Meaning |
|---|---|
| 000 | Only synchronous UHD delivery is possible for the linked UHD sub-service. |
| 001 | Only asynchronous UHD delivery is possible for the linked UHD sub-service. The UHD sub-service referenced by linked information (associated_service_TSID, associated_service_original_network_id, associated_service_id, and internet_linkage_internet_linkage_information) is delivered afterwards. |
| 010 | Only asynchronous UHD delivery is possible for the linked UHD sub-service. The UHD sub-service referenced by linked information ((associated_service_TSID, associated_service_original_network_id, associated_service_id, and internet_linkage_information) was previously delivered. |
| 011 | Both synchronous and asynchronous UHD deliveries are possible for the linked UHD sub-service. The UHD sub-service referenced by linked information ((associated_service_TSID, associated_service_original_network_id, associated_service_id, and internet_linkage_information) is re-delivered afterwards and it is simultaneously delivered with current event as well. |
| 100 | Both synchronous and asynchronous UHD deliveries are possible for the linked UHD sub-service. The UHD sub-service referenced by linked information ((associated_service_TSID, associated_service_original_network_id, associated_service_id, and internet_linkage_information) was already delivered and it is simultaneously delivered with current event as well. |

FIG. 16

| sei_message( ) { | C | Descriptor |
|---|---|---|
| payloadType = 0 | | |
| while( next_bits( 8 ) = = 0xFF ) } | | |
| ff_byte /* equal to 0xff */ | 5 | f(8) |
| payloadType += 255 | | |
| } | | |
| last_payload_type_byte | 5 | u(8) |
| payloadType += last_payload_type_byte | | |
| payloadSize = 0 | | |
| while( next_bits( 8 ) = = 0xFF ) } | 5 | f(8) |
| ff_byte /* equal to 0xFF */ | | |
| payloadSize += 255 | | |
| } | | |
| last_payload_size_byte | 5 | u(8) |
| payloadSize += last_payload_size_byte | | |
| sei_payload( payloadType, payloadSize) | 5 | |
| } | | |

| sei_payload (payloadType, payloadSize) | c | Format |
|---|---|---|
| if(payloadType==37) | | |
| UHD_sub_stream_info (payloadSize ) | 5 | |

FIG. 17

| Syntax | C | Format |
|---|---|---|
| UHD_sub_stream_info (payloadSize ) { | | |
|     sub_stream_ID | 5 | u(16) |
|     sub_stream_type | 5 | u(8) |
|     sub_video_grid_hor | 5 | u(4) |
|     sub_video_grid_ver | 5 | u(4) |
|     if (sub_stream_type=0x01) { | | |
|         residual_sub_stream_ID | 5 | u(16) |
|     } | | |
|     if (sub_stream_type=0x02) { | | |
|         associated_sub_stream_ID | 5 | u(16) |
|     } | | |
| } | | |

FIG. 18

| Stream_content | Component_type | Meaning |
|---|---|---|
| 0x05 | 0x90 | H.264/AVC video, 4K UHD, 50Hz (25Hz), 16:9 |
| 0x05 | 0x91 | H.264/AVC video, 4K UHD, 60Hz (30Hz), 16:9 |
| 0x05 | 0x92 | H.264/AVC video, 8K UHD, 50Hz (25Hz), 16:9 |
| 0x05 | 0x93 | H.264/AVC video, 8K UHD, 60Hz (30Hz), 16:9 |
| 0x05 | 0x94 | H.264/AVC video, part of 4K UHD, 50Hz (25Hz), 16:9 |
| 0x05 | 0x95 | H.264/AVC video, part of 4K UHD, 60Hz (30Hz), 16:9 |
| 0x05 | 0x96 | H.264/AVC video, part of 8K UHD, 50Hz (25Hz), 16:9 |
| 0x05 | 0x97 | H.264/AVC video, part of 8K UHD, 60Hz (30Hz), 16:9 |
| 0x05 | 0x98 | H.264/AVC video, HD compatible part of 4K UHD, 50Hz (25Hz), 16:9 |
| 0x05 | 0x99 | H.264/AVC video, HD compatible part of 4K UHD, 60Hz (30Hz), 16:9 |
| 0x05 | 0x9A | H.264/AVC video, HD compatible part of 8K UHD, 50Hz (25Hz), 16:9 |
| 0x05 | 0x9B | H.264/AVC video, HD compatible part of 8K UHD, 60Hz (30Hz), 16:9 |
| 0x09 | 0x10 | Advanced codec video(EX : HEVC), 4K UHD, 50Hz (25Hz), 16:9 |
| 0x09 | 0x11 | Advanced codec video(EX : HEVC), 4K UHD, 60Hz (30Hz), 16:9 |
| 0x09 | 0x12 | Advanced codec video(EX : HEVC), 8K UHD, 50Hz (25Hz), 16:9 |
| 0x09 | 0x13 | Advanced codec video(EX : HEVC), 8K UHD, 60Hz (30Hz), 16:9 |
| 0x09 | 0x14 | Advanced codec video(EX : HEVC), part of 4K UHD, 50Hz (25Hz), 16:9 |
| 0x09 | 0x15 | Advanced codec video(EX : HEVC), part of 4K UHD, 60Hz (30Hz), 16:9 |
| 0x09 | 0x16 | Advanced codec video(EX : HEVC), part of 8K UHD, 50Hz (25Hz), 16:9 |
| 0x09 | 0x17 | Advanced codec video(EX : HEVC), part of 8K UHD, 60Hz (30Hz), 16:9 |
| 0x09 | 0x18 | Advanced codec video(EX : HEVC), HD compatible part of 4K UHD, 50Hz (25Hz), 16:9 |
| 0x09 | 0x19 | Advanced codec video(EX : HEVC), HD compatible part of 4K UHD, 60Hz (30Hz), 16:9 |
| 0x09 | 0x1A | Advanced codec video(EX : HEVC), HD compatible part of 8K UHD, 50Hz (25Hz), 16:9 |
| 0x09 | 0x1B | Advanced codec video(EX : HEVC), HD compatible part of 8K UHD, 60Hz (30Hz), 16:9 |

APPARATUS FOR TRANSMITTING VIDEO STREAM, APPARATUS FOR RECEIVING VIDEO STREAM, METHOD FOR TRANSMITTING VIDEO STREAM, AND METHOD FOR RECEIVING VIDEO STREAM

This application is a continuation of U.S. patent application Ser. No. 14/234,593 filed Jan. 23, 2014, which is a National Stage Entry of International Application No. PCT/KR2012/005887 filed on Jul. 24, 2012, and claims priority to U.S. Provisional Application No. 61/511,559 filed Jul. 26, 2011, all of which are hereby incorporated by reference for all purposes as if fully set forth herein in their entireties.

TECHNICAL FIELD

The present invention relates to an apparatus for transmitting a video stream, an apparatus for receiving a video stream, a method for transmitting a video stream, and a method for receiving a video stream.

BACKGROUND ART

As video signal processing speed increases, research is underway into a method for encoding/decoding an ultra high definition (UHD) video. An UHD video is defined as a video having definition four times or sixteen times higher than that of a high definition (HD) image. High-efficiency codec technology for transmitting a television signal containing the UHD video is being developed by some standards organizations for a single codec. However, current broadcast systems do not have a technique for transmitting the UHD video defined therefor. Accordingly, even if a method for encoding/decoding the UHD video is proposed, current broadcast systems cannot transmit/receive the UHD video.

In addition, even if a system to transmit and receive the UHD video is provided, it is rarely possible to immediately utilize the system if the system is not compatible with a conventional video transceiving system. Accordingly, compatibility with the conventional broadcast or video transceiving system is also an issue.

DISCLOSURE

Technical Problem

An object of the present invention devised to solve the problem lies in an apparatus for transmitting a video stream, an apparatus for receiving a video stream, a method for transmitting a video stream, and a method for receiving a video stream which are capable of efficiently transceiving an ultra high definition video stream.

Another object of the present invention is to provide an apparatus for transmitting a video stream, an apparatus for receiving a video stream, a method for transmitting a video stream, and a method for receiving a video stream which are capable of transceiving a video stream compatible with the current broadcast system and implementing an ultra high definition video stream.

Technical Solution

The object of the present invention can be achieved by providing a method for transmitting a video stream including the steps of downsampling an ultra high definition (UHD) video stream to split the UHD video stream into a sub-stream of a viewable high definition (HD) compatible video, a sub-stream of an HD-size video, and a sub-stream of a residual signal representing a difference between the HD compatible video and the HD-size video, and encoding each of the split sub-streams, multiplexing signaling information describing a relation between the UHD video stream and at least one of the sub-streams with the at least one of the sub-streams, and transmitting the at least one multiplexed HD video sub-stream and the signaling information.

The signaling information may include an identifier of the sub-stream of the HD compatible video or the sub-stream of the HD-size video. The signaling information may include information about a service type supportable by a video signal transmitted by the sub-stream. The signaling information may further include an identifier of a video sub-stream associated with the sub-stream of the residual signal. The signaling information may include information about a transmission medium for the sub-stream of the HD compatible video or the sub-stream of the HD-size video.

In another aspect of the present invention, provided herein is a method for transmitting a video stream including the steps of demultiplexing a stream containing at least one of a sub-stream of a high definition (HD) compatible video, a sub-stream of an HD-size video, and a sub-stream of a residual signal representing a difference between the HD compatible video and the HD-size video and signaling information describing a relation between a stream of a UHD video and at least one of the sub-streams, the sub-streams being obtained by downsampling the UHD video, decoding the demultiplexed signaling information, and decoding the demultiplexed sub-stream of the HD compatible video or the demultiplexed sub-stream of the HD-size video using the decoded signaling information.

In another aspect of the present invention, provided herein is an apparatus for transmitting a video stream including an encoder to downsample an ultra high definition (UHD) video stream to split the UHD video stream into a sub-stream of a viewable high definition (HD) compatible video, a sub-stream of an HD-size video, and a sub-stream of a residual signal representing a difference between the HD compatible video and the HD-size video, and to encode each of the split sub-streams, a multiplexer to multiplex signaling information describing a relation between the UHD video stream and at least one of the sub-streams with the at least one of the sub-streams, and a transmitter to transmit the at least one multiplexed HD video sub-stream and the signaling information.

In a further aspect of the present invention, provided herein is an apparatus for receiving a video stream including a demultiplexer to demultiplex a stream containing at least one of a sub-stream of a high definition (HD) compatible video, a sub-stream of an HD-size video, and a sub-stream of a residual signal representing a difference between the HD compatible video and the HD-size video and signaling information describing a relation between a stream of a UHD video and at least one of the sub-streams, the sub-streams being obtained by downsampling the UHD video, a signaling information decoder to decode the demultiplexed signaling information, and a video decoder to decode the demultiplexed sub-stream of the HD compatible video or the demultiplexed sub-stream of the HD-size video using the decoded signaling information.

Advantageous Effects

According to one embodiment of the present invention, an ultra high definition video stream may be efficiently transmitted and received.

In addition, according to one embodiment of the present invention, a video stream compatible with the current broadcast system may be transmitted and received, along with implementation of an ultra high definition video stream.

DESCRIPTION OF DRAWINGS

FIG. 7 is a view exemplarily illustrating signaling information according to one embodiment of the present invention;

FIG. 8 is a view exemplarily illustrating a sub-stream descriptor in signaling information according to one embodiment of the present invention;

FIG. 9 is a view exemplarily illustrating the sub_stream_type field according to one embodiment of the present invention;

FIG. 11 is a view exemplarily illustrating a combine descriptor according to one embodiment of the present invention;

FIG. 12 is a view exemplarily illustrating values of the UHD_sub_service_type field;

FIG. 13 is a view exemplarily illustrating values of the original_UHD_resolution field;

FIG. 14 is a view exemplarily illustrating values of the Linked_media_sync_type field;

FIG. 16 is a view exemplarily illustrating a format of an SEI message of an elementary video stream;

FIG. 17 is a view exemplarily illustrating sampling information according to a technique of downsampling of a UHD video in an elementary video stream;

FIG. 18 is a view exemplarily illustrating identifying UHD content using stream_content and component_type in a DVB system;

BEST MODE

Hereinafter, embodiments of the present invention will be described with reverence to the drawings.

A description will be given of an embodiment of splitting an H×V video into an HD compatible video steam, n HD-size h×v video streams, and an additional video stream to transmit a residual signal.

For example, H×V may represent UHD resolution of 3840×2160, and h×v may represent high definition (HD) resolution of 1920×1080. The size of H×V relative to h×v may vary depending upon splitting techniques and the number of split streams. For example, a 4K UHD video stream may be split into four HD video streams and an additional video stream. Alternatively, a 16K UHD video stream, for example, may be split into 16 HD video streams and an additional video stream according to the resolutions of the UHD video streams and the HD streams. The additional video stream to transmit a residual signal will be described in detail below.

The illustrated embodiment related to a relation between a UHD video stream and an HD video stream is applicable to an example of subsampling a video stream of a first resolution to transmit and receive video streams and an additional video stream of a second resolution.

Hereinafter, a description will be given of an example of splitting a 4K UHD video stream into one HD compatible video stream, three HD-size video streams and an additional video steam. However, embodiments of the present invention are not limited thereto. The same concept is applicable to different splitting techniques and sizes. In addition, in the description given below, the videos before and after splitting of a video stream will be represented by terminological pairs such as video and sub-video, content and sub-content, stream and sub-stream, and service and sub-service. In addition, when a stream carrying a sub-video, a sub-stream, a sub-content, or a sub-service is transmitted, it may be an elementary video stream, which is a unit of independent transmission.

Hereinafter, the HD compatible video represents a video compatible with an HD video that is produced by downsampling and filtering a UHD video. The HD-size video, which is a term distinguished from 'HD compatible video', represents an HD-size video obtained simply by sampling a UHD video. The residual signal represents a difference between an HD compatible video and an HD-size video. An HD-size video may be an HD compatible video in the case that the image quality thereof is level with that of the HD compatible video (i.e., in the case that the size of a residual signal is small).

Figure 1:
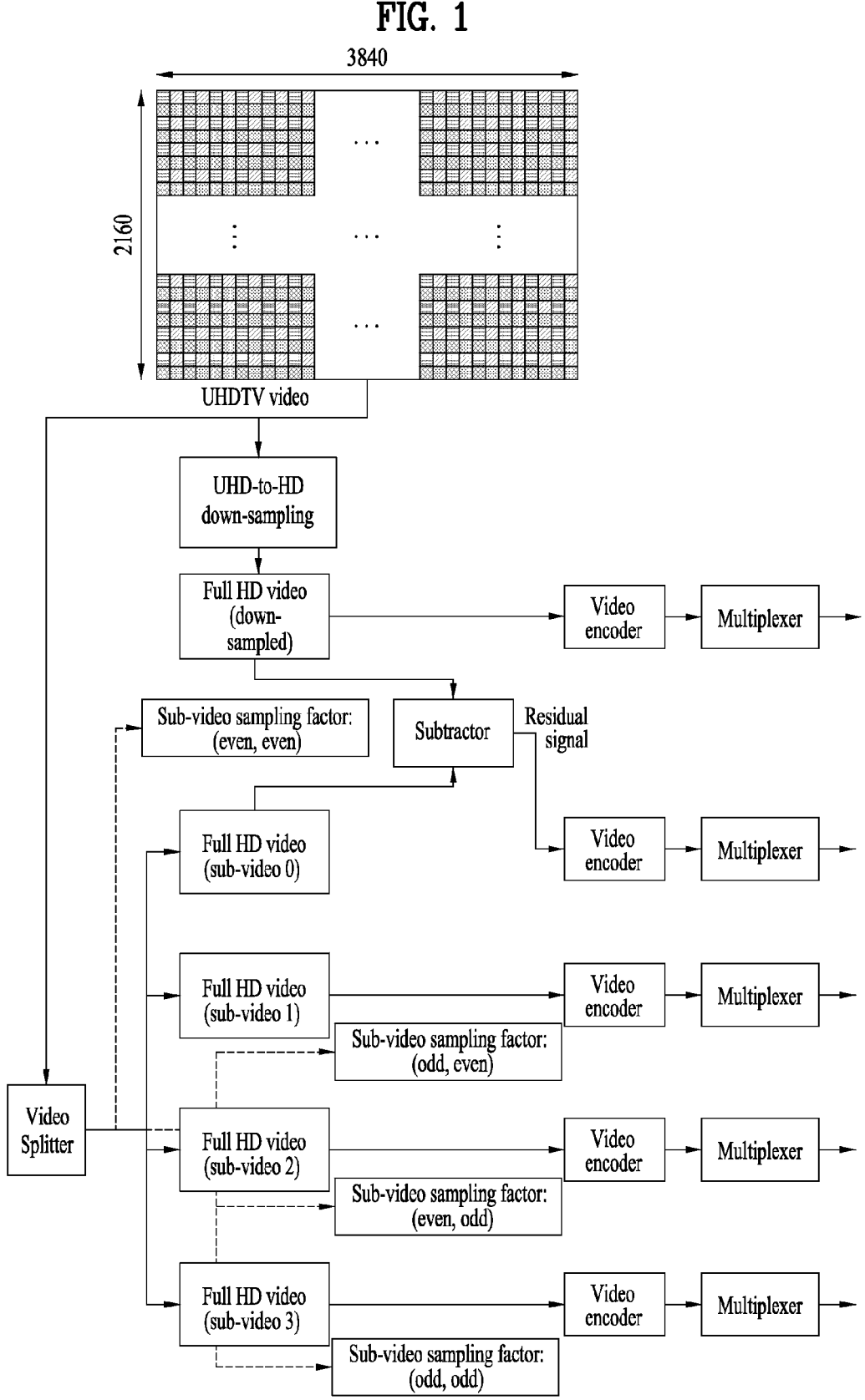
FIG. 1 is a view illustrating an example of transmission of an ultra high definition (UHD) video stream according to one embodiment of the present invention.

FIG. 1 is a view illustrating an example of transmission of a UHD video stream according to one embodiment of the present invention.

A UHD-to-HD downsampler downsmaples a UHD resolution video into an HD resolution video. The video signal produced through downsampling may be a viewable HD compatible video. Herein, by filtering the UHD resolution video with a low pass filter and downsampling the same (filtering and downsampling may be performed in a reverse order), a HD compatible video (indicated by down-sampled) may be output. The downsampling process will be described later with reference to the drawings.

Video encoder may receive and encode the down-sampled HD compatible video, outputting a video stream. A multiplexer receives the down-sampled HD video signal and multiplexes the signaling information thereof, outputting a multiplex stream.

A video splitter may split a 3840×2160 UHD video stream into four sub-streams by perform downsampling according to sub-video sampling factors. Each of the four split sub-streams may be a 1920×1080 HD-size video stream. In FIG. 1, the four HD-size video streams may be respectively referred to as sub-video 0, sub-video 1, sub-video 2, and sub-video 3. In some cases, the sub-videos may be viewable video signals (HD compatible videos) as full HD video streams.

The sub sampling factors used in downsampling may be respectively referred to as (even, even), (odd, even), (even, odd), (odd, odd) for the respective split streams, which will be described in detail later.

In this embodiment, video encoders may use the respective subsampling factors to encode the respective sub-videos (sub-videos 0, 1, 2 and 3) into HD-size video streams. Alternatively, videos for at least one sub-video may be collected, and thereby one sub-stream may be transmitted.

Each of the multiplexers may multiplex an encoded video stream and signaling information and output a multiplexed stream. The output stream may be transmitted over the same broadcast medium, or may be transmitted over two or more media such as broadcast media or Internet media. The signaling information will be described below in detail.

Meanwhile, a subtractor may output a residual signal, which represents the difference between the HD compatible video produced through downsampling by the UHD-to-HD downsampler and a HD-size video of the sub-videos split by the video splitter. In FIG. 1, the residual signal exemplarily represents the difference between the HD compatible video and the sub-video 0. However, a residual signal may be produced based on the HD compatible video, and sub-videos 1, 2 or 3.

An example of extracting the residual signal will be described in detail later with reference to the drawings.

The residual signal may be separately encoded and output into a separate video stream by a corresponding video encoder, and the separate video stream may be multiplexed with other information by a multiplexer.

Herein, the multiplexer may multiplex the HD compatible video stream produced by downsampling a UHD video and the video stream of the residual signal separately and output separate streams as shown in FIG. 1, or may multiplex the HD compatible video stream and the video stream of the residual signal into one video stream.

Figure 2:
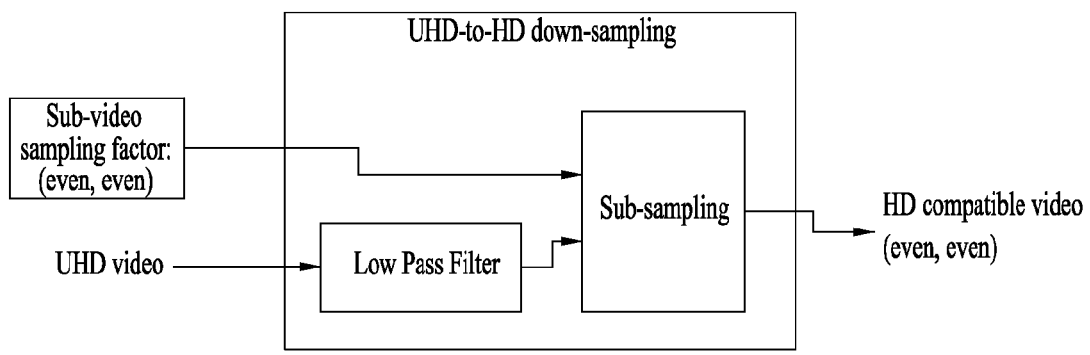
FIG. 2 is a view illustrating an example of downsampling a UHD video into an HD compatible video in detail.

FIG. 2 is a view illustrating an example of downsampling a UHD video into an HD compatible video in detail.

The HD compatible video may be obtained by filtering the UHD video with a low pass filter and subsampling a signal produced through low pass at a corresponding position using a subsampling factor ((even, even) in FIG. 2).

Accordingly, in FIG. 1, the HD compatible video may be obtained using a video (a full HD video indicated by (down-sampled)) obtained with the low pass filter or using videos (indicated by sub-videos 0, 1, 2 and 3) obtained by performing subsampling without low pass filtering.

Figure 3:
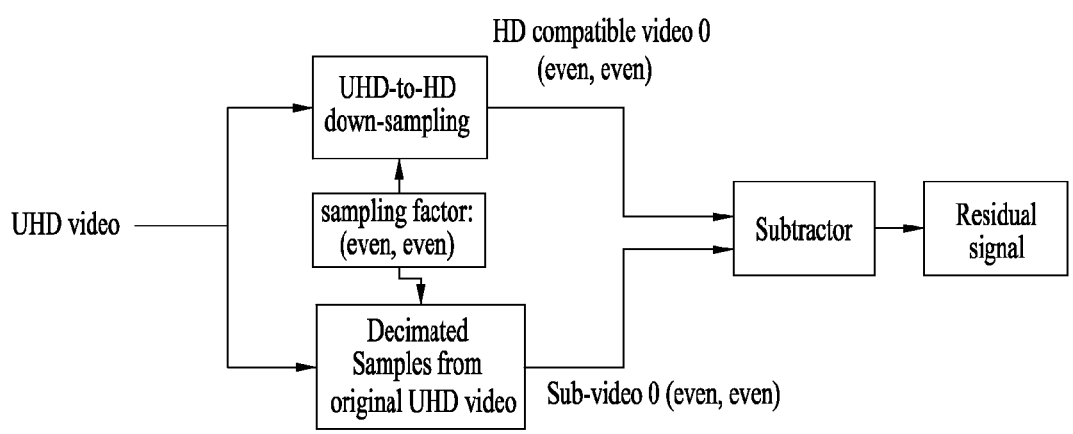
FIG. 3 is a view illustrating an example of acquiring a residual signal for a HD video signal from a UHD video.

FIG. 3 is a view illustrating an example of acquiring a residual signal for a HD video signal from a UHD video.

The subtractor may output the difference between a signal of a down-sampled HD compatible video (indicated by HD compatible), produced by subsampling the UHD video according a subsampling factor, and a signal produced through subsampling or decimation of the UHD video using a subsampling factor. In this case, the output signal may be used as the residual signal. In the illustrated embodiment, a video signal for the service of HD video may be acquired by downsampling the UHD video. In the downsampling or decimation process, filtering may be properly performed to satisfy the quality of an HD video. Since the HD signal produced through filtering is differentiated from the UHD video, the difference between the two signals may be compensated with the residual signal by multiplexing the residual signal with a separate stream or an HD compatible video stream and transmitting the same.

Figure 4:
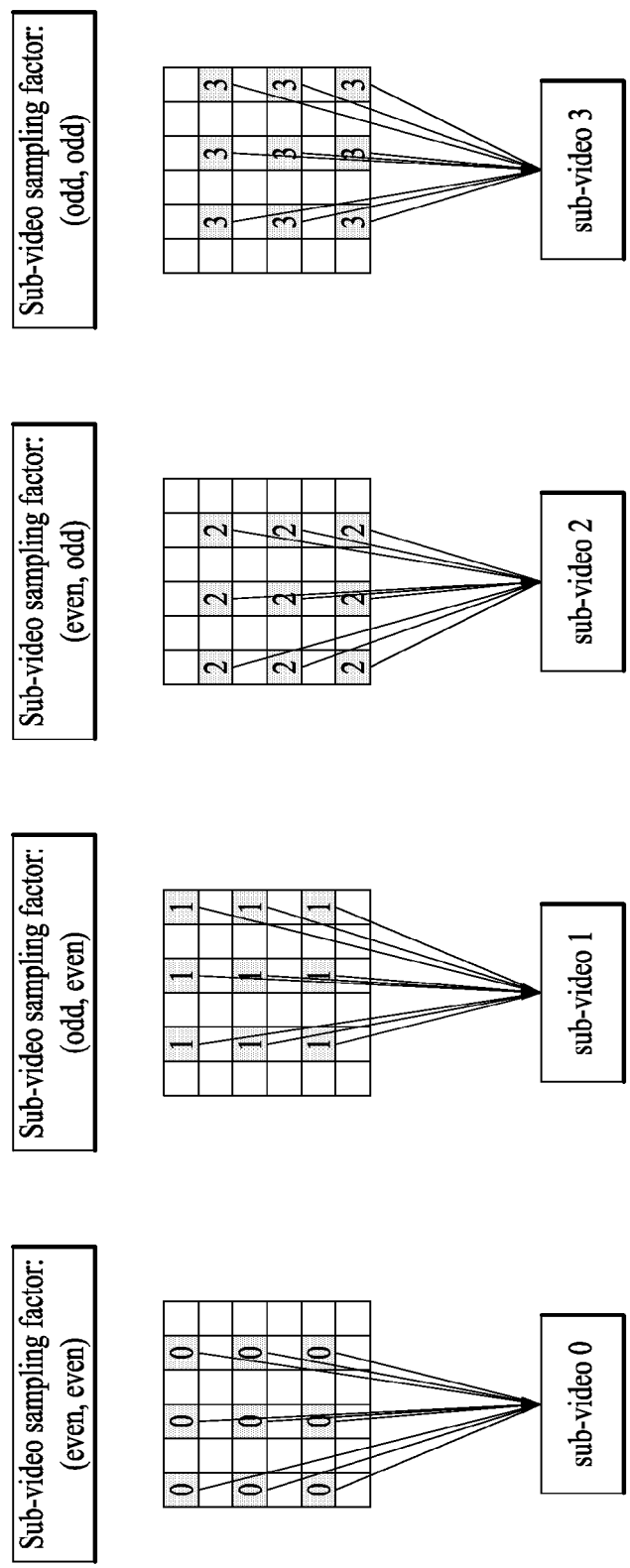
FIG. 4 is a view illustrating an example of a video splitter subsampling a UHD video stream into an HD-size video.

FIG. 4 is a view illustrating an example of a video splitter subsampling a UHD video stream into an HD-size video.

The video splitter subsamples a UHD video stream into an HD-size video stream according to a sub-video sampling factor. Depending upon the difference in resolution between the UHD video and the HD video, a plurality of sub-video sampling factors may be provided. In this example, the resolution of the UHD video is four times higher than that of the HD-size video, and thus four sub-video sampling factors ((even, even), (odd, even), (even, odd), (odd, odd)) are exemplarily provided. Four pixels included in a 2×2 pixel may be divided and numbered 0, 1, 2, and 3, as shown in FIG. 4.

According to (even, even), which is a first sub-video sampling factor, an HD-size video, sub-video 0 may be made by subsampling the upper left pixels, indicated by 0, included in the 2×2 pixel of the UHD video. According to (odd, even), which is a second sub-video sampling factor, an HD-size video, sub-video 1 may be made by subsampling the upper right pixels, indicated by 1, included in the 2×2 pixel of the UHD video. According to (even, odd), which is a third sub-video sampling factor, an HD-size video, sub-video 2 may be made by subsampling the lower left pixels, indicated by 2, included in the 2×2 pixel of the UHD video. Similarly, according to (odd, odd), which is a fourth sub-video sampling factor, an HD video, sub-video 3 may be made by subsampling the lower right pixels, indicated by 3, included in the 2×2 pixel of the UHD video.

In the case that the UHD video has a resolution four times higher that of the HD-size video, when subsampling is performed as shown in the figure, and the residual signal is small, all the sub-videos 0, 1, 2, and 3 may be viewable HD-size video content.

Figure 5:
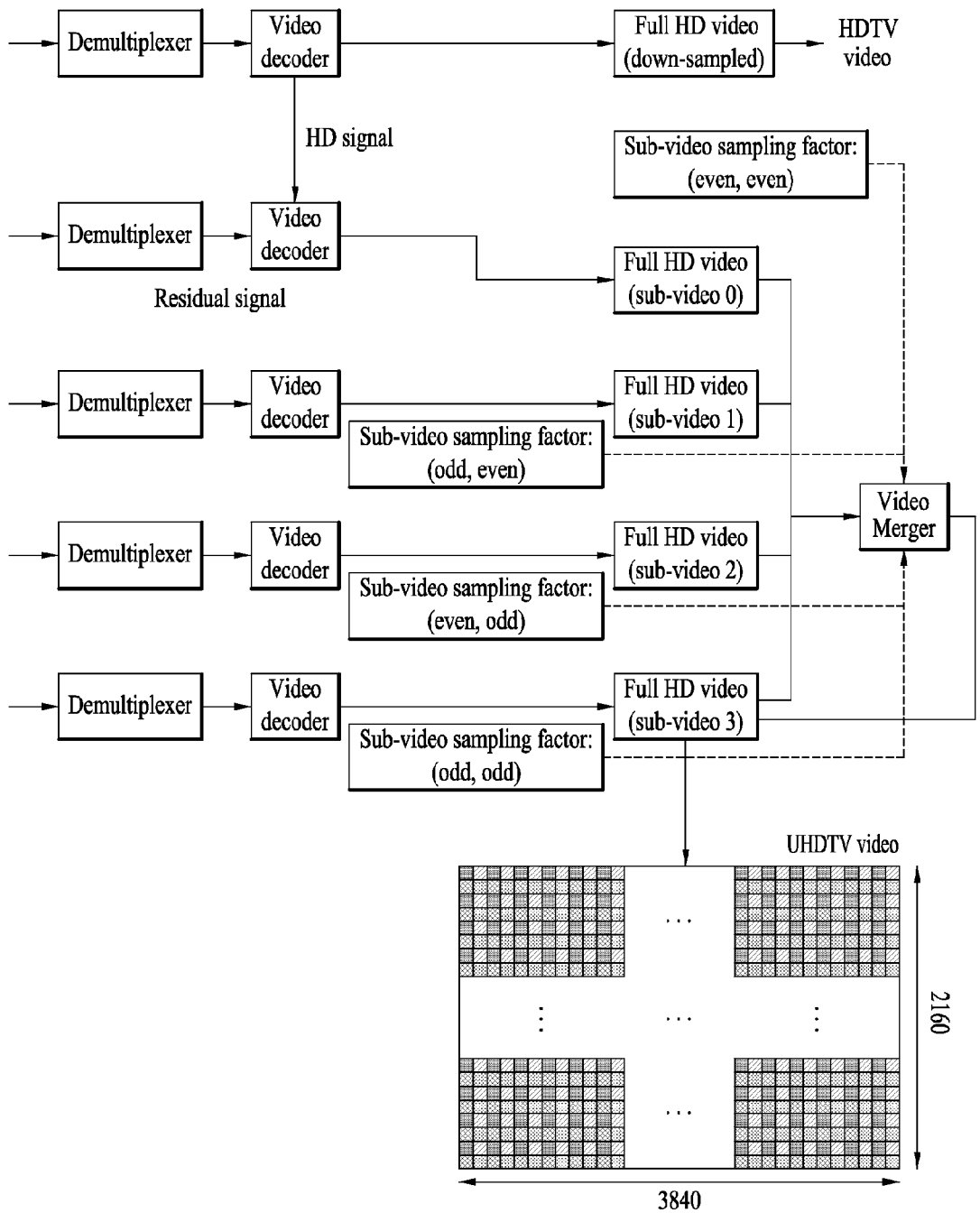
FIG. 5 is a view illustrating an example of a stream receiver configured to receive and process split HD video streams according to one embodiment of the present invention.

FIG. 5 is a view illustrating an example of a stream receiver to receive and process split HD video streams according to one embodiment of the present invention.

Each of the demultiplexers receives a stream produced by multiplexing at least one of an HD compatible video stream produced through subsampling of a corresponding UHD video stream, an HD-size video stream produced through subsampling, and a video stream according to the residual signal with signaling information therefor, and demultiplexes the received stream, outputting the HD compatible video stream or the HD-size video stream.

In the case that one sub-stream is transmitted by combining two or more sub-videos or by combining one HD compatible video stream and the residual signal in contrast with the illustrated example, the demultiplexers may demultiplex a video stream produced by multiplexing two or more sub-videos or one HD compatible video stream and the residual signal and output a corresponding stream.

The video decoders may decode the HD streams according to the respective sub sampling factors and output the decoded streams. In the case that a demultiplexer demultiplexes an HD compatible video stream, the corresponding video decoder may decode the HD compatible video and output an HD video stream (an HDTV video).

In the case that the demultiplexer demultiplexes the residual signal, the corresponding video decoder may receive HD compatible video data from a video decoder that decodes an HD compatible video stream associated with the residual signal, and decode the residual signal and an HD-size sub-video included in the UHD video. Herein, the HD sub-video is indicated by sub-video 0.

A video merger may merge the four video streams of sub-videos 0, 1, 2 and 3 into one UHD video stream using the sub sampling factors and output the UHD video stream. For example, following the process of the FIG. 1 in reverse order, the video merger may output one UHD video stream from the HD-size video streams produced through subsampling.

According to this embodiment, in the case that the receiver is allowed to output only an HD video, it outputs an HD compatible video. In the case that the receiver is allowed to output a UHD video, it may selectively output an HD compatible video or a UHD video.

Figure 6:
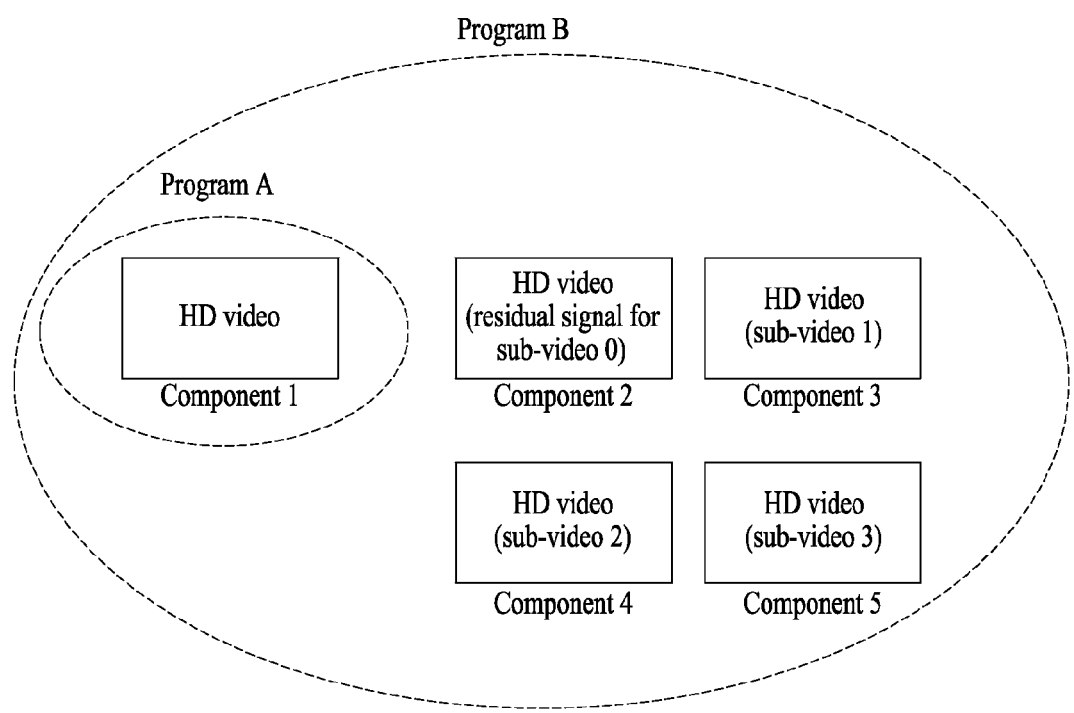
FIG. 6 is a view illustrating an example of configuration of a program or channel for transmission and reception of a UHD video stream.

FIG. 6 is a view illustrating an example of configuration of a program or channel for transmission and reception of a UHD video stream. Herein, the terms program, service, and channel may be used to represent the same meaning.

In FIG. 6, Program A may be Service A or Channel A. In addition, Program B may be Service B or Channel B.

In the illustrated example, Program B represent program components capable of providing a UHD video, and Program A represents a program component capable of providing an HD compatible video using a UHD video. According to this example, Program B may include the component of Program A. the components of Program B and the component of Program A (i.e., a video produced from Program B through downsampling) may be transceived over different channels.

According to the illustrated example, Program A is an HD compatible video component obtained from the UHD video (Component 1). Program B may include the HD compatible video component obtained from the UHD video (Component 1), a video component according to the residual signal for sub-video 0 (Component 2), a video component according to the residual signal for sub-video 1 (Component 3), a video component according to the residual signal for sub-video 2 (Component 4), and a video component according to the residual signal for sub-video 4 (Component 5).

When the above components are transmitted and signaling information therefor is properly transmitted, a conventional HD video stream receiver decodes the HD compatible video component (Component 1) and outputs a video. In addition, a UHD video stream receiver may decode the HD compatible video component (Component 1) and the video component according to the residual signal for sub-video 0 (Component 2) and decode the video component according to the residual signal for sub-video 1 (Component 3), video component according to the residual signal for sub-video 2 (Component 4), and video component according to the residual signal for sub-video 4 (Component 5), thereby merging the decoded videos into the UHD video.

In the example described above, Components 3, 4 and 5 represent results of subsampling or decimation of a UHD video, and Component 1 represents a result of subsampling or decimation of a UHD video or a result of downsampling of the UHD video using filtering. In addition, Component 2 represents a result according to the residual signal of the video according to Component 1.

Hereinafter, a description will be given of signaling information in the case that a UHD video stream is transceived through an HD video stream or a video stream according to the residual signal for the HD video stream. In the case that a video stream with the first resolution is split into video streams with the second resolution, signaling information may be used to output the video stream of the first resolution or the video streams of the second resolution according to the capability of the receiver.

FIG. 7 exemplarily illustrates signaling information according to one embodiment of the present invention. The signaling information may be included in a descriptor describing each split video stream and may thus be included in the broadcast signaling information.

The descriptor may signal stream information about, for example, whether a sub-video stream is produced by subsampling an HD compatible video stream or a UHD video, what sub-videos are contained in the stream, and what subsampling technique is used. In FIG. 7, a program map table (PMT) is illustrated as an example of the broadcast signaling information that includes the signaling information. Description of each field in the PMT may comply with ISO/IEC 13818-1 (MPEG-2 systems).

Herein, to identify the split streams, the stream_type may be 0x02 or 0x1B. To identify streams according to a high-performance codec that supports UHD videos such as UHD video streams, a separate value of the stream_type may be used.

In this example, to implement signaling of a UHD video stream or an HD video stream produced through subsampling of the UHD video stream, a descriptor in the program level and a descriptor at the stream level may be used respectively.

In this embodiment, the descriptor in the program level (denoted by UHDTV_service_combine_descriptor) may include, for example, signaling information for merging multiple HD video streams (an HD compatible video and an HD-size video) or video streams according to residual signals into one UHD video stream. Hereinafter, the descriptor is referred to as a combine descriptor.

In this embodiment, the descriptor in the stream level (denoted by UHDTV_sub_stream_descriptor) may include, for example, signaling information capable of describing the HD video streams or video streams according to the residual signals respectively. Hereinafter, this descriptor is referred to as a sub-stream descriptor.

Hereinafter, two descriptors and the content signaled by the descriptors will be described. For ease of description of embodiments of the present invention, a sub-stream descriptor (denoted by UHDTV_sub_stream_descriptor) will first be described.

FIG. 8 is a view exemplarily illustrating a sub-stream descriptor in the signaling information according to one embodiment of the present invention. The sub-stream represents an elementary video stream that can be independently transmitted. Sub-streams may respectively correspond to the components of FIG. 6, or at least one component may be referred to as a sub-stream.

The descriptor_tag field represents an identifier to identify this descriptor.

The descriptor_length field may represent the length of this descriptor in bits.

The sub_stream_ID field represents an ID value assigned to indentify each video stream included in a UHD video. Values may be sequentially assigned to the respective sub-streams, taking the upper leftmost pixel as a reference pixel. For example, a lower value may be assigned to a video stream having a reference pixel positioned farther to the upper left side in a UHD video.

The elementary stream_PID field, which represents an identifier of an elementary video stream, may serve as the sub_stream_ID field. For example, the sub_stream_ID field may be expressed in 2 bits for a 4K UHD video screen, while it may be expressed in 4 bits for an 8K UHD video screen.

The sub_stream_type field may represent the type of a component/element including the UHD video service. A detailed description of the sub_stream_type field will be given later with reference to the drawings.

The sub_video_grid_hor field indicates a pixel or area sampled in the lateral direction of a screen, i.e., a sub-video grid. In other words, when a UHD screen is implemented using multiple sub_videos, this field may inform of a pixel grid in the UHD screen to which the sub videos are mapped. For a 4K UHD screen, this field may indicate two values (identifying an even-numbered line or an odd-numbered line). For an 8K UHD screen, this field may indicate four values (identifying line No. 0 to line No. 3).

The sub_video_grid_ver field indicates a pixel or area sampled in the vertical direction of the screen, i.e., a sub video grid. That is, when a UHD screen is implemented using a sub_video, this field informs of pixel positions in the UHD screen to which the pixels belonging to a sub-video are mapped. For a 4K UHD screen, this field may indicate two values (an even-numbered line or an odd-numbered line). For an 8K UHD screen, this filed may indicate four values (line No. 0 to line No. 3).

In a scheme different from the above two fields, a combination of a plurality of pixels may also be expressed in the case that multiple sampling grids are included. For example, in the case that bits included in the two fields indicate whether or not a grid is included, and line No. N is included, bit N may be set to '1'.

The residual_sub_stream_ID field informs of the sub_stream_ID or elementary_PID of an element including a residual signal for each component/element. In this example, when the sub_stream_type field indicates that the element of a UHD video service is an HD compatible video component and a sub-video obtained from the UHD video (sub_stream_type=0x01), or that the element of the UHD video service is a Non-HD compatible video component and a sub-video obtained from the UHD (sub_stream_type=0x03), the residual_sub_stream_ID field indicates the sub_stream_ID or elementary_PID of an element containing a residual signal.

When the component/element is a residual signal, the associated_sub_stream_ID field indicates the sub_stream_ID or elementary_PID of a component/element which may be combined with the residual signal to produce a sub_video stream. In this example, when the sub_stream_type field indicates that a stream is a residual signal (sub_stream_type=0x04), the associated_sub_stream_ID field indicates indicates the sub_stream_ID or elementary_PID of an associated component/element.

FIG. 9 is a view exemplarily illustrating the sub_stream_type field according to one embodiment of the present invention.

When the value of the sub_stream_type field is 0x00, it indicates that the stream is a stream of an HD compatible video and complete sub-video component. That is, the field indicates that the video of the stream is a sub-video of a UHD video, that a complete sub-video can be acquired by decoding the element, and that the stream is a sub-stream viewable through an HD receiver.

When the value of the sub_stream_type field is 0x01, it indicates that the stream is a stream of an HD compatible video and complete sub-video component. That is, the field indicates that the video of the stream is a sub-video of a UHD video, and that an additional delta signal is needed for reconstruction of the UHD video. It may also indicate that the stream can be combined with the delta signal into a video viewable through an HD receiver.

When the value of the sub_stream_type field is 0x02, it indicates that the stream is a stream of a non-HD compatible video and complete sub-video component. That is, the field indicates that a complete sub-video can be acquired when the video element of the stream is decoded, but exclusively outputting the stream to view the video is not recommended.

When the value of the sub_stream_type field is 0x03, it indicates that the stream is a stream of a non-HD compatible video component and complete sub-video component. Accordingly, the field indicates that the video can be combined with a delta signal into a sub-video of the UHD video, but exclusively outputting the stream to view the video is not recommended.

When the value of the sub_stream_type field is 0x04, it indicates that the stream is a residual signal for a sub-video component. Accordingly, the field indicates that the stream is transmitted as a delta signal for a sub-video component to output a UHD video.

When the value of the sub_stream_type field is 0x05, it may indicate the stream contains multiple sub-videos.

When the value of the sub_stream_type field is 0x06, it indicates that the stream is a stream of a video compatible with the resolution of the UHD video, e.g., 3840×2160 (4K UHDTV).

Figure 10:
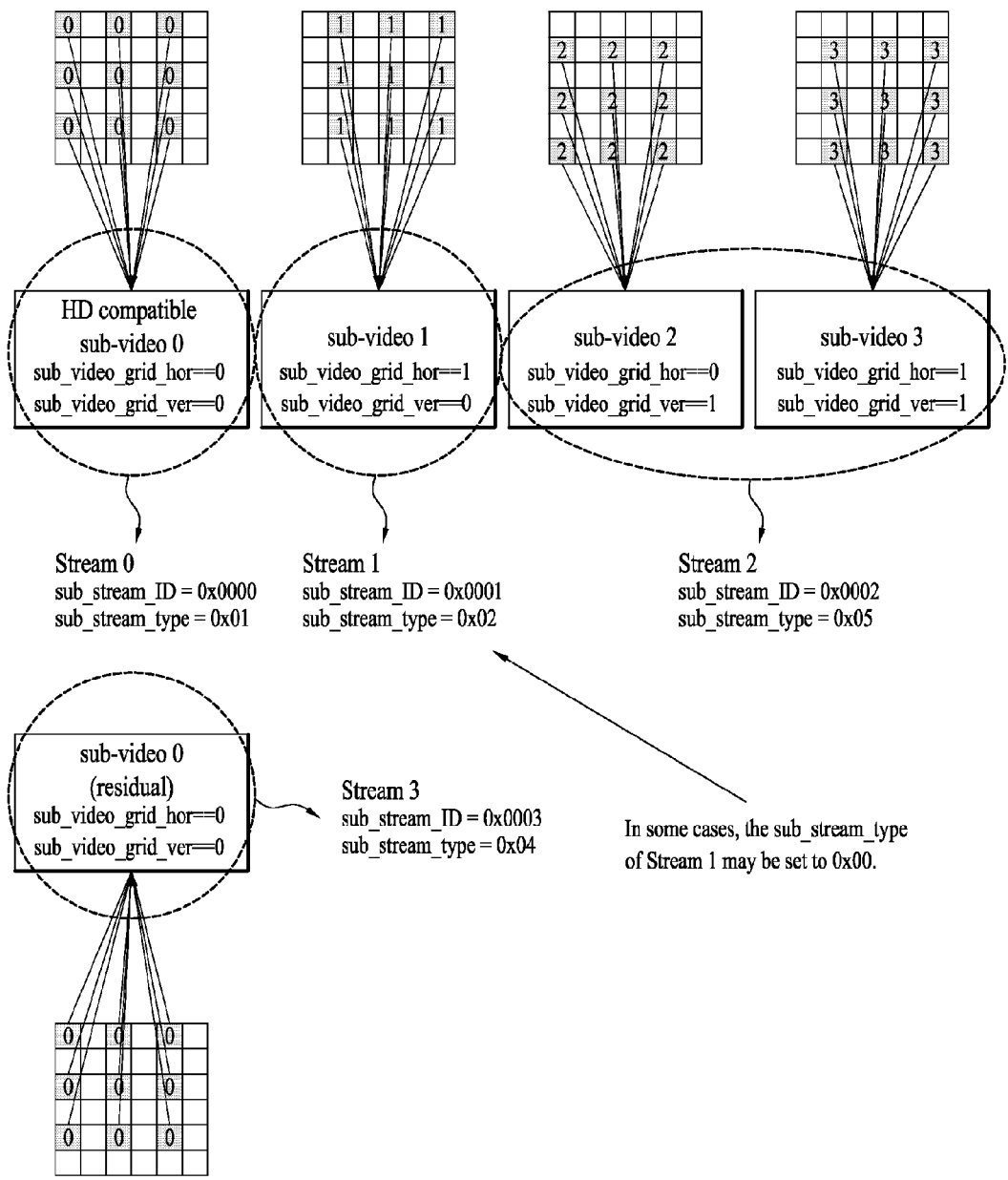
FIG. 10 is a view illustrating an example of allocating component or element acquired from a UHD video stream to a sub-stream.

FIG. 10 is a view illustrating an example of allocating component or element acquired from a UHD video stream to a sub-stream.

A UHD video may be spit into a compatible video, a sub-video and a residual signal and transmitted. The split data may be separately transmitted, or a stream produced by combining two or more data may be transmitted. In the illustrated example, a 4K UHD video is split and streams are respectively transmitted. In the case that the resolution of the video changes, the video stream may be transmitted through various combinations.

Stream 0 is a stream over which an HD compatible sub-video is transmitted. That is, a video stream of HD resolution produced by downsampling and filtering the UHD video is transmitted. In this case, downsampling may be performed by collecting pixels form the same sample grid of a quartet (2×2 pixels). In this example, sub_video_grid_hor=00 and sub_video_grid_ver=00. These values indicate that an upper left pixel of the 2×2 pixels has been used to downsample the UHD video into a sub-video. According to this example, the sub_stream_ID of stream 0 is 0x0000, and the sub_stream_type is 0x01.

Stream 1 is a stream over which sub-video 1 of the UHD video is transmitted. That is, a video stream of HD resolution produced by downsampling the UHD video is transmitted. In this example, sub_video_grid_hor=01 and sub_video_grid_ver=00. These values may indicate that an upper right pixel of the 2×2 pixels has been used to downsample the UHD video into a sub-video. the sub_stream_ID of stream 1 is 0x0001, the sub_stream_type is 0x02. For stream 1, the sub_stream_type may be set to 0x00. For example, if an HD video is produced through downsampling of the UHD video (without filtering) and is viewable, the sub_stream_type may be set to 0x00.

Stream 2 is a stream over which sub-video 2 and sub-video 3 of the UHD video are transmitted. In this example, sub_video_grid_hor=0 and sub_video_grid_ver=1 for for sub-video 2. These values may indicate that a lower left pixel of the 2×2 pixels has been used to downsample the UHD video into the sub-video. In addition, for sub-video 3, sub_video_grid_hor=1 and sub_video_grid_ver=1. These values may indicate that a lower right pixel of the 2×2 pixels has been used to downsample the UHD video into the sub-video. According to the illustrated example, the sub_stream_ID of stream 2 is set to 0x0002, and the sub_stream_type is set to 0x05.

Stream 3 represents a stream over which a residual signal of sub-video 0 is transmitted. For the residual signal of sub-video 0, sub_video_grid_hor=0 and sub_video_grid_ver=0. These values may indicate that a lower left pixel of the 2×2 pixels has been used to downsample a video into the sub-video. According to the illustrated example, the sub_stream_ID of stream 3 is set to 0x0003, and the sub_stream_type is set to 0x04.

FIG. 11 is a view exemplarily illustrating a combine descriptor according to one embodiment of the present invention. The combine descriptor, denoted by UHDTV_service_combine_descriptor in FIG. 11, will be described below.

The UHDTV_service_combine_descriptor may include fields as follows.

The descriptor_tag field may indicate an identifier of the descriptor in the program level, and the descriptor_length field may indicate the length of UHDTV_service_combine_descriptor.

The original_UHD_resolution field represents the resolution of an original UHD screen that may be output by collecting all the streams included in a UHD program (service). An exemplary description of a value of the original_UHD_resolution field will be given later with reference to the drawings.

The UHD_sub_service_type field may indicate types of sub-services which can be supported only with steams described in the current program (service and channel) level. Details of the value of this field will be described later with reference to FIG. 12.

The linked_UHD_sub_service type field may indicate a value of the UHD_sub_service_type for a service associated with the current program (service or channel).

The num_linked_media field may indicate the number of associated media provided through services or media other than the current delivery medium to implement the original UHDTV broadcast.

The linked_media_type field may indicate the types of associated media. If the field is 00, the field may indicate that information associated with a program (service) to be currently described is transmitted to other services, channels, or programs in the same broadcast transmission medium. If linked_media_type is 01, it may indicate that information associated with a program (service) to be currently described can be transmitted through another transmission medium such as the Internet.

The Linked_media_sync_type field may indicate how a UHD sub-service to be connected is acquired and synchronized by the receiver. This field will be described in detail with reference to FIG. 14.

In the cast that an associated stream included in a UHD stream is transmitted through the same medium (linked_media_type=0), the combine descriptor may include Linked_UHD_sub_service_type, associated_service_TSID, associated_service_original_network_id, and associated_service_id. In the cast that an associated stream included in the UHD stream is transmitted through another medium (linked_media_type=1), the combine descriptor may include Linked_UHD_sub_service_type, and internet_linkage_information.

The associated_service_TSID field may indicate the value of transport_stream_id of a program (service) including a stream to be combined with the program (service) described by the descriptor to provide a compete UHD service.

The associated_service_original_network_id field may indicate the value of original_network_id of a service including a stream to be combined with the program (service) described by the descriptor to provide a compete UHD service.

The associated_service_id field may indicate the value of service_id of a service including a stream to be combined with the program (service) described by the descriptor to provide a compete UHD service.

While the combine descriptor is illustrated in this embodiment as including service_id, it may include the linked_program_number field. In this case, the linked_program_number field, which has a meaning similar to that of the program_number field of the PMT, identifies the program number for a stream which can be combined.

Internet_linkage_information indicates connection information about the Internet connected to provide a complete UHD program (service). The information may include at least one of (1) whether the IP address information is 32 bits or 128 bits, (2) IP address information, (3) Port number information, (4) additional information such as URI for an additional stream, and (5) available time slot (e.g., start time, expiration time, etc. for transmission of a service).

FIG. 12 is a view exemplarily illustrating values of the UHD_sub_service_type. As described above, in the combine descriptor, the values of the UHD_sub_service_type field may indicate types of sub-services which can be supported only with a service according to a steam currently being described.

For example, if the UHD_sub_service_type field is 000, it may indicate that a stream which can be exclusively output does not exist in the current. That is, this field may indicate that only non-compatible streams exist in the currently described stream, and additional data may be received through another service or medium in addition to the currently described service (program) for the UHD service.

If the UHD_sub_service_type field is 001, it may indicate that an HD compatible stream is included in the currently described UHD service, but a 4K UHD or 8K UHD service is not exclusively supportable. Accordingly, it may indicate that additional data may be received through another service or medium in addition to the data provided through the service (program) currently described for the UHD service.

If the UHD_sub_service_type field is 010, it may indicate that a 4K UHD compatible stream is included in the currently described UHD service, but a HD or 8K UHD service is not exclusively supportable. Accordingly, it may indicate that additional data may be received through another service or medium, in addition to the data provided through the service (program) currently described for the UHD service.

If the UHD_sub_service_type field is 011, it may indicate that all streams needed to support the original UHD broadcast are included in the currently described UHD service. Herein, the original UHD broadcast refers to a UHD broadcast corresponding to the value of the original_UHD_resolution.

FIG. 13 is a view exemplarily illustrating values of the original_UHD_resolution field described above.

If the original_UHD_resolution field is 00, it may indicate the 4k UHD resolution of 3840×2160. If the original_UHD_resolution field is 01, it may indicate the 4k UHD resolution of 7680×4320. FIG. 13 illustrates the values of the original_UHD_resolution field. Although not illustrated in FIG. 13, a screen format of a 4096×2160 resolution may also be signaled to a value of the original_UHD_resolution field. In this case, crop rectangle-related parameters (frame_crop_left_offset, frame_crop_right_offset, frame_crop_top_offset, frame_crop_bottom_offset, etc.) may be additionally used in the process of video encoding of a stream for HD compatibility. At this time, the video decoder may set the output data to the 1920×1080 resolution or may configure a HD compatible video signal using bar data.

FIG. 14 is a view exemplarily illustrating values of the Linked_media_sync_type field described above. This field describes how a linked UHD sub-video can be obtained. As illustrated in FIG. 14, a sub-stream or sub-video may be a video component for a UHD service. In addition, the sub-stream or sub-video may be transmitted using at least one broadcast channel, or may be transmitted through at least one broadcast channel and another physical medium.

For example, a first sub-stream may be transmitted over a terrestrial broadcast channel, while second, third and fourth sub-streams may be transmitted over an IP stream on the Internet. Accordingly, when video components are transmitted over separate transmission means, it may be indicated how they can be synchronized through signaling.

Therefore, synchronous delivery represents the case in which two or more components are transmitted in real time. In this case, the two or more components are synchronized and expressed by the receiver. Asynchronous delivery represents the case in which any one of the components is transmitted in non-real time. In this case, the receiver pre-stores a first component, and receives another component transmitted thereafter. Then, the receiver synchronizes and expresses both components.

For example, in the case that the value of the Linked_media_sync_type field is 000, it indicates that only synchronous UHD delivery is possible for the linked UHD sub-streams (services). Accordingly, in this case, the linked UHD sub-streams (services) may be transmitted in real time, and synchronized with each other to express the UHD service.

If the value of the Linked_media_sync_type field is 001, it indicates that asynchronous UHD delivery is possible for the linked UHD sub-streams (services), and the UHD sub-streams (services) referenced by the link information (e.g., associated_service_TSID, associated_service_original_network_id, associated_service_id, internet_linkage_information, etc.) is transmitted thereafter. Accordingly, in this case, the linked UHD sub-streams (services) may be transmitted in non-real time, and when the receiver receives the link information, it may synchronize the UHD sub-streams (services) transmitted in non-real time with each other and express the UHD services.

If the value of the Linked_media_sync_type field is 010, it indicates that asynchronous UHD delivery is possible for the linked UHD sub-streams (services), and the UHD sub-streams (services) referenced by the link information (e.g., associated_service_TSID, associated_service_original_network_id, associated_service_id, internet_linkage_information, etc.) has already been transmitted. Accordingly, in this case, the linked UHD sub-streams (services) may have already been transmitted in non-real time, and the receiver may synchronize the UHD sub-streams (services) transmitted at different points of time using the link information and express the UHD services.

If the value of the Linked_media_sync_type field is 011, it indicates that both the synchronous UHD delivery and the asynchronous UHD delivery are possible for the linked UHD sub-streams (services), and that the UHD sub-streams (services) referenced by the link information (e.g., associated_service_TSID, associated_service_original_network_id, associated_service_id, internet_linkage_information, etc.) is retransmitted later or is being transmitted upon occurrence of the current event.

If the value of the Linked_media_sync_type field is 100, it indicates that both the synchronous UHD delivery and the asynchronous UHD delivery are possible for the linked UHD sub-streams (services), and that the UHD sub-streams (services) referenced by the link information (e.g., associated_service_TSID, associated_service_original_network_id, associated_service_id, internet_linkage_information, etc.) has already been transmitted or is being transmitted upon occurrence of the current event.

The combine descriptor and the sub-stream descriptor have been exemplarily described above. Information that can be included in each descriptor has also been described. The sub-stream descriptor may include a descriptor for each stream. In this case, information such as the compatibility of each stream and sampling factors may be known, but the information about the entire configuration of an original UHD broadcast is not provided. Accordingly, information about the entire configuration of the UHDTV broadcast, which needs to be provided in the program/channel/service levels, may be signaled to provide the UHD broadcast. The information may include the number of constituent streams, channel/service information including each stream, and an indication of whether each stream is transmitted in real time or non-real time, which have already been disclosed with regard to the combine descriptor.

Since operation of the receiver may vary depending upon whether or not the UHD sub-services provided over the channels are synchronized, this is considered in signaling in the illustrated embodiment. That is, the UHD sub-services may all be synchronized and output in real time upon being received, or they may be asynchronously configured and a portion or entirety thereof may be stored in the receiver and then output after being combined with components transmitted later.

Next, a description will be given of a format of a video stream in the case that a UHD video is transmitted according to the method exemplarily described above. Once subsampling of a UHD video is performed, the video encoder may encode the subsampled video into elementary video streams according the following format and then output the encoded video.

Figure 15:
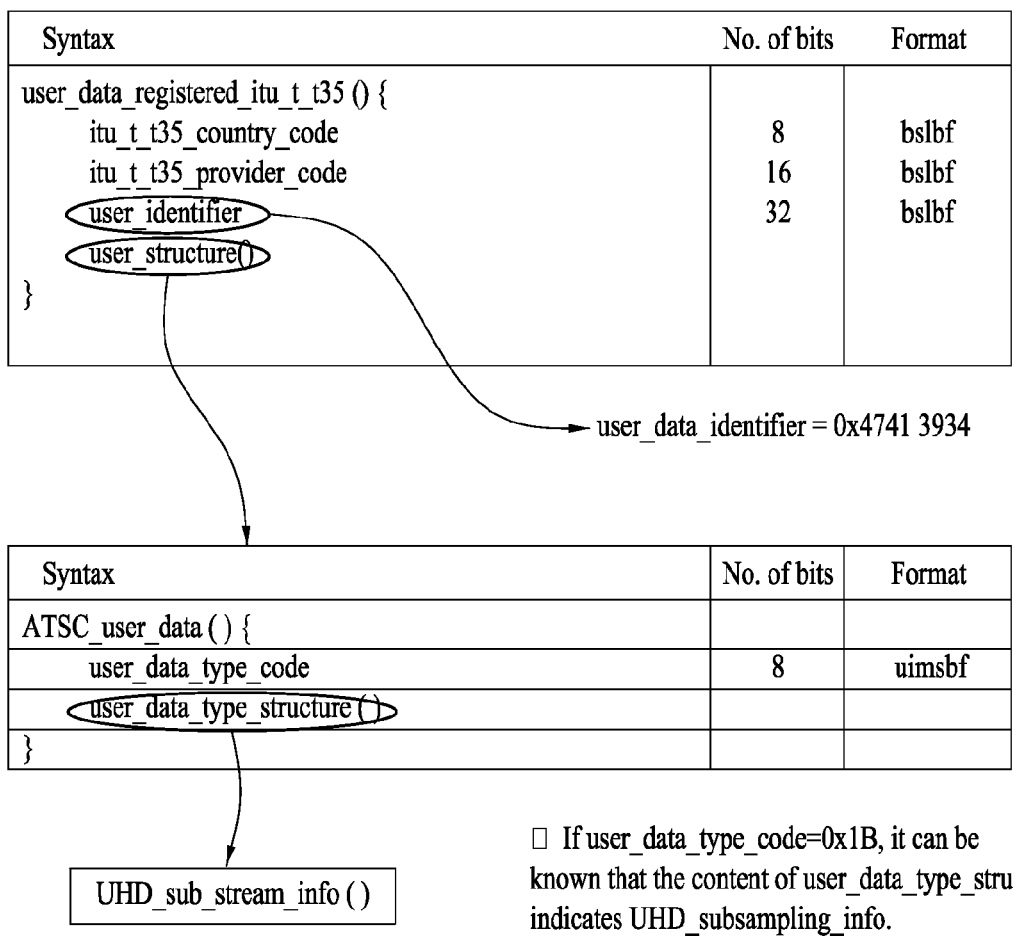
FIG. 15 is a view exemplarily illustrating a format of a supplemental enhancement information (SEI) payload of an elementary video stream.

First, the header of the elementary video streams described above may have a format of a supplemental enhancement information (SEI) message illustrated in FIGS. 15 and 16.

FIG. 15 illustrates the format of a supplemental enhancement information (SEI) payload of an elementary video stream. In the case that the payload type of the SEI payload is 5, it may have a payload format according to user_data_registered_itu_t_t35( ).

Herein, the user_identifier field may have a value of 0x4741 3934, and the user_structure field may have a format exemplarily described below. In addition, in the case that user_data_type_code is 0x1B, user_data_type_structure( ) may contain information on UHD_sampling_info, which describes sub-streams according to the technique of subsampling of the UHD video. The content of UHD_sampling_info will be described in detail with reference to FIG. 17.

FIG. 16 is a view exemplarily illustrating a format of the SEI message of an elementary video stream. In the case that payloadType of the SEI message is 37, sampling information (UHD_sampling_info) may be contained.

FIG. 17 is a view exemplarily illustrating sampling information according to a technique of subsampling of a UHD video in an elementary video stream. Herein, fields in the syntax of the described sampling information (UHD_sampling_info) identical to those of FIG. 8 have the same meaning as those of the fields described above with reference to FIG. 8.

A description has been given above of an example of the combine descriptor and the sub-stream descriptor being included in the PMT. However, the illustrated descriptors may be added to VCT of ATSC PSIP. At this time, both the combine descriptor and the sub-stream descriptor illustrated above may be included in the description in the channel level.

For example, in the case that the combine descriptor (UHDTV_service_combine_descriptor) is included in the TVCT, the combine descriptor (UHDTV_service_combine_descriptor) may be located at the position of a channel loop. In this case, associated_service_id in the combine descriptor (UHDTV_service_combine_descriptor) may be replaced with associated_program_number or associated_major_channel_number and associated_minor_channel_number. In addition, a described program (service) and an identifier (associated_source_id) of an associated source which can express the program into a UHD video may be added to the combine descriptor (UHDTV_service_combine_descriptor).

The associated_program_number field indicates a program number for a service video stream associated with a signaled sub-video stream, and the associated_major_channel_number field and the associated_minor_channel_number field respectively indicate major and minor channel numbers for a service video stream associated with the signaled sub-video stream. In addition, the associated_source_id field may indicate the channel number or source_id of a channel containing a stream to be combined. Since the combine descriptor (UHDTV_service_combine_descriptor) has been described, a replaced or added field is omitted in the drawings.

The two descriptors described above may be added to the SDT of the DVB SI. In this case, both the combine descriptor and the sub-stream descriptor described above may be included in a descriptor in the service level.

As another example, the combine descriptor (UHDTV_service_combine_descriptor) described above may be included in the position of transport_stream_loop in the Network Information Table. In this case, the receiver may obtain, using the combine descriptor (UHDTV_service_combine_descriptor) in the NIT, information about, for example, how a service to be described is transmitted over a stream obtained from an original UHD video, based on the fields such as trasnport_stream_id and original_network_id. In addition, the receiver may obtain, from the combine descriptor (UHDTV_service_combine_descriptor) in the NIT, information about, for example, whether the received service is a stream which can be exclusively output and which sub-video it includes. The receiver may also know information about a service to be additionally connected to obtain a complete UHD video, using this descriptor.

As another example, the exemplary UHD video may be included in an event information table (EIT) of the ATSC or the DVB. The combine descriptor (UHDTV_service_combine_descriptor) described above may be included in the position of the event loop in the event information table.

In the case that the combine descriptor (UHDTV_service_combine_descriptor) is transmitted to the EIT of the ATSC, the associated_service_id field of the combine descriptor described above may be replaced with the associated_program_number field which identifies a program associated with expression of a UHD video. The associated_source_id field to identify a source associated with expression of the UHD video and the associated_event_id field to identify an event associated with expression of the UHD video may be added to the combine descriptor. As described above, the associated_program_number indicates a program number of a service video stream associated with a signaled sub-video stream. The associated_source_id field and the associated_event_id field respectively indicate an event identifier and a source ID of a video steam associated with the signaled sub-video stream. In the case of the DVB, the associated_event_id field to identify an event associated with expression of a UHD video may be added to the combine descriptor.

When a UHD video stream is transmitted, signaling information additionally containing the following fields may also be transmitted depending upon a transmission system.

Depending upon a transmission system, the signaling information may include component type information or stream_type information. Signaling using the component type information may inform of the type of each stream through the values of the stream_content field and the component_type field. Accordingly, using the values of components of a stream, a value allowing determination of the UHD_subsampling mode, codec information, and resolution information may be allocated and signaled.

Even in the case that the stream_type information is used, a new value for the UHD video stream may be allocated and signaled. A UHD service may be classified according to a codec used and the type of a contained stream and signaled by allocating a different service_type to the classified UHD service. In this case, a service according to an HD video compatible stream produced through subsampling of the UHD service may be viewed in the conventional HD service, using the same service_type as that of the conventional HD service.

In addition, the conventional receiver may be blocked from receiving a UHD video signal which is not compatible with the HD video by performing signaling using the component type and stream_type or service_type.

FIG. 18 is a view exemplarily illustrating identifying UHD content using the stream_content and component_type in a DVB system. In the DVB system, the component descriptor may identify the type of a component stream, and may be used to provide a description of a text of an elementary stream. The component descriptor may be included in the EIT or SDT, and may describe the features of an element (video element) included in an event or a service.

In this case, the types of sub-content that may be included in UHD content, as shown in FIG. 18, may be signaled. The sub-content is produced using the UHD content. The sub-content may be compatible or incompatible with the UHD content. For example, components illustrated in FIG. 18 may transmit the sub-videos illustrated in FIG. 1. In this case, the elements such as the sub-video sampling factors (e.g., (even, odd)), the horizontal_sampling_factor and the vertical_sampling_factor may also be used to describe each component.

For example, if stream_content is 0x05 and component_type is 0x90, they may indicate that the corresponding sub-content is 4K UHD content as H.264/AVC video content and content of 50 Hz (25 Hz) and the aspect ratio of 16:9.

If stream_content is 0x05 and component_type is 0x94, they may indicate that the corresponding sub-content is a part of 4K UHD content as H.264/AVC video content and content of 60 Hz (30 Hz) and the aspect ratio of 16:9.

Herein, part of 4K UHD indicates the case in which that sub-video data of a part of the 4K UHD content is included, but an independently meaningful video (e.g., an HD video) cannot be provided. In the above description, components having the aspect ratio of 16:9 have been provided as an example. In the case that the aspect ratio different from 16:9 (e.g., 21:9) is used, a value of the component_type field for this ratio may be additionally set.

If stream_content is 0x05 and component_type is 0x98, they indicate that the corresponding sub-content is a part of 4K UHD content as H.264/AVC video content and a part of a video signal for outputting an HD compatible video. The stream_content of 0x05 and component_type of 0x98 may serve as an identifier to indicate a stream or component for a residual signal. This example indicates that the stream is content of 60 Hz (30 Hz) and the aspect ratio of 16:9.

If stream_content is 0x09 and component_type is 0x10, they indicate that the corresponding sub-content is a part of 4K UHD content and a part of a UHD video signal of 4K resolution as advanced codec video content such as HEVC.

If stream_content is 0x05 and component_type is 0x14, they indicate that the corresponding sub-content is a part of a UHD video signal of 4K resolution, which in turn indicates that the stream is content of 50 Hz (25 Hz) and the aspect ratio of 16:9.

Similarly, if stream_content is 0x09 and component_type is 0x18, they indicate that the corresponding sub-content is a part of 4K UHD content as advanced codec video content such as HEVC. For example, they may serve as an indicator to indicate the sub-content is a stream or component for a residual signal.

In the case that the component is encoded using spatial scalable coding and transmitted, the base layer may use the same method as in the conventional HD and separately allocate values of stream_content and component_type for the enhancement layer for providing spatial scalability. For example, if stream_content is 0x05 and component_type is 0xA0, they may indicate H.264/AVC spatial scalable extension video, 4K UHD, 50 Hz (25 Hz), and 16:9. This stream cannot be independently decoded, but a meaningful video may be output when the stream is combined with a base layer video. Further, in the case that an advanced codec is used, a UHD video may be provided through a method similar to that described above when the spatial scalability is provided based on the codec.

Hereinafter, a description will be given of a receiver that outputs a UHD video or HD video using the UHD video stream and the signaling information according to the method described above. Examples of the receiver may include a receiver capable of receiving and expressing a UHD video, and a receiver capable of expressing an HD video which is a part of the UHD video. Embodiments of video outputs for these two receivers will be schematically described below.

A description will first be given of a conventional HD video receiver which receives a UHD sub-stream and outputs an HD video.

In the case that a video carrying a service is transmitted over an HD compatible stream (i.e., in the case of Program A in FIG. 6), the receiver may output an HD video in the same manner as in receiving a conventional HD video. In this case, the UHD sub-service (video) transmitted over the HD compatible stream may be signaled with the same service_type and stream_type (for PSI signaling, service_type==0x02 and stream_type==0x1B) as in the case of a broadcast service including a conventional HD video.

The conventional HD video receiver cannot recognize the descriptors included in the PMT, such as the sub-stream descriptor (UHDTV_sub_stream_descriptor ( )) and the combine descriptor ((UHDTV_service_combine_descriptor ( )). Accordingly, in the case that the service is not transmitted over the HD compatible stream, the conventional receiver cannot recognize the channel when a new service_type is allocated to the service.

A receiver capable of receiving and expressing a UHD video may combine received sub-streams and output the UHD video. An embodiment of this receiver will be described below.

First, the receiver determines whether a separate service or medium needs to be additionally received to implement an original UHD video, using the signaling information received over a first channel (service), for example, the combine descriptor (UHDTV_service_combine_descriptor) in the PMT.

In the case that data to be received over a separate channel or path exist, the receiver may obtain, from the signaling information, connection information allowing the receiver to receive an associated service.

To receive the associated service, the receiver uses a separate tuner (or an Internet access module) to tune (access) a second (or third) associated service based on the pre-acquired connection information.

In some cases (e.g., when linked_media_sync_type indicates asynchronous mode), schedules of the components of a UHD video received over the first channel and the second and third paths associated therewith may be different from each other. In this case, necessary data may be stored or received in advance using the schedule information received over each path (channel).

Then, the sub-streams received over the first, second and third channels (paths) are decoded. In the case that all the sub-streams are included in one program (Program B in FIG. 6), all the necessary sub-streams received over one channel are decoded.

In this case, the receiver may acquire information for reconstruction of the UHD video through a sub-stream descriptor (UHDTV_sub_stream_descriptor) allocated to each of the sub-streams belonging to respective services. From the acquired information, the receiver may obtain information about, for example, the sub_video included in each stream and a sample grid in the entire UHD video where the sub_video is located. The location of the sample grid may be obtained using the sub_video_grid_hor field and the sub_video_grid_ver field.

The video merger may restore the UHD video using multiple sub-videos based on the obtained information.

Figure 19:
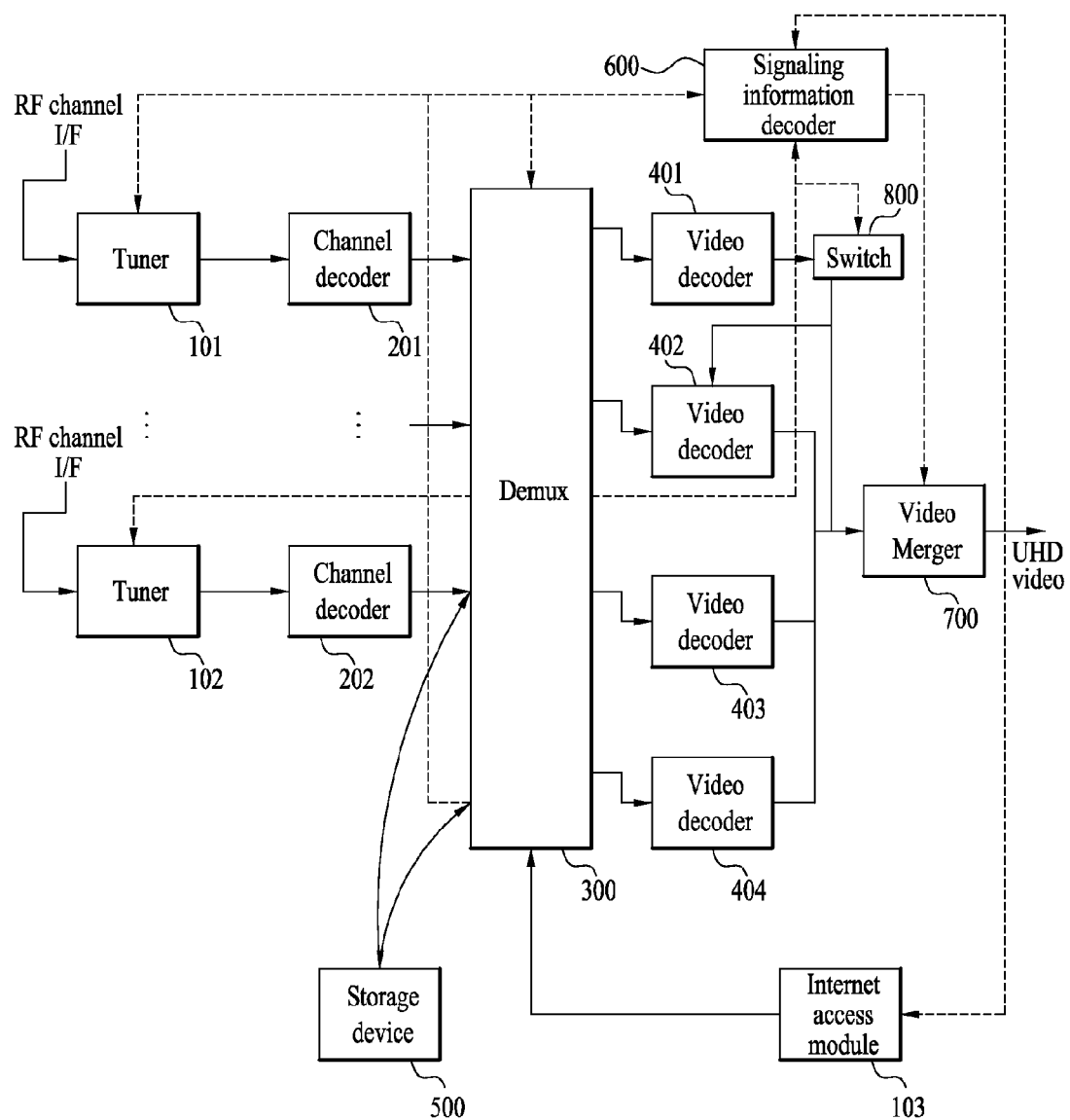
FIG. 19 is a view illustrating an example of a receiver according to the illustrated embodiment of the present invention.

FIG. 19 is a view illustrating an example of the receiver described above according to one embodiment of the present invention. The receiver may include a receive unit, a channel decoder, a demultiplexer 300, a video decoder, a storage device 500, a signaling information decoder 600, a video merger 700, and a switch 800.

The receive unit 100 may include at least one tuner or/and at least one Internet access module 101, 102, 103. The at least one tuner 101 and 102 of the receive unit may receive an RF channel to transmit a UHD video signal.

The Internet access module 103 of the receive unit may receive an Internet signal to transmit a UHD video signal. Herein, the UHD video signal may transmit the entire UHD video, or may be a video signal split from the UHD video.

The video signal split from the UHD video may be video compatible with an HD video or a residual signal described above.

The channel decoders 201, 202 may channel-decode a broadcast signal tuned by the tuners 101 and 102.

The demultiplexers 300 may receive a channel-decoded video signal and/or Internet signal and demultiplex video signals split from the UHD video respectively. Herein, when the demultiplexed video signals are merged, the UHD video may be obtained. For example, the demultiplexer 300 may demultiplex stream 0 shown in FIG. 6, or may demultiplex all streams 0 to 3.

The signaling information decoder 600 may decode the signaling information transmitted over a broadcast signal or an Internet signal. The combine descriptor and the stream descriptor have already been exemplarily described above as examples of the signaling information.

Each of the video decoders 401, 402, 403 and 404 may decode the demultiplexed video using the decoded signaling information or the signaling information in the video stream. The decoded signaling information is illustrated in FIGS. 7, 11 and 18, and the signaling information in the video stream is illustrated in FIGS. 15 to 17.

In the case that the decoded video signal is a video split from the UHD video, the video merger 700 may merge the decoded video signals and output a UHD video signal. The receiver may include only one of a path to process an HD compatible video (sub-video 0 of FIG. 6) and a residual signal (sub-video 0 (residual) of FIG. 6) and a path to process HD videos (sub-videos 1, 2 and 3 of FIG. 6) produced simply through subsampling of the UHD video among the illustrated video processing paths.

In the case that the decoded video signal is an HD video produced simply through subsampling of the UHD video or an HD compatible video recovered using a residual signal, the receiver may output one of the two HD videos using the decoded signaling information.

The storage device 500 may store a video signal received from at least one tuner or/and at least one Internet access module 101, 102 and 103. For example, in the case that a stream for any one of the components in Program B of FIG. 6 is first received, the storage device 500 may store the received stream. That is, in the case that a part of the HD video streams split from the UHD video are asynchronously transmitted, the storage device 500 may store the video stream received first.

In the case that programs including video streams capable of outputting a UHD video are received through multiple sub-streams, the sub-stream stored in the storage device 500 and the sub-streams received in real time are decoded together, the video merger 700 may merge the videos recovered from the video streams to output the UHD video.

In the case that the video decoder 401 outputs data by decoding the residual signal, the switch 800 may perform switching operation using this data to output data to a video decoder 402 configured to decode an HD compatible video the decoded video or to allow the video decoder 401 to output data produced by decoding the video obtained simply through subsampling of the UHD video.

The video merger 700 may merge the HD videos or HD compatible videos split from the UHD video, outputting the UHD video.

Figure 20:
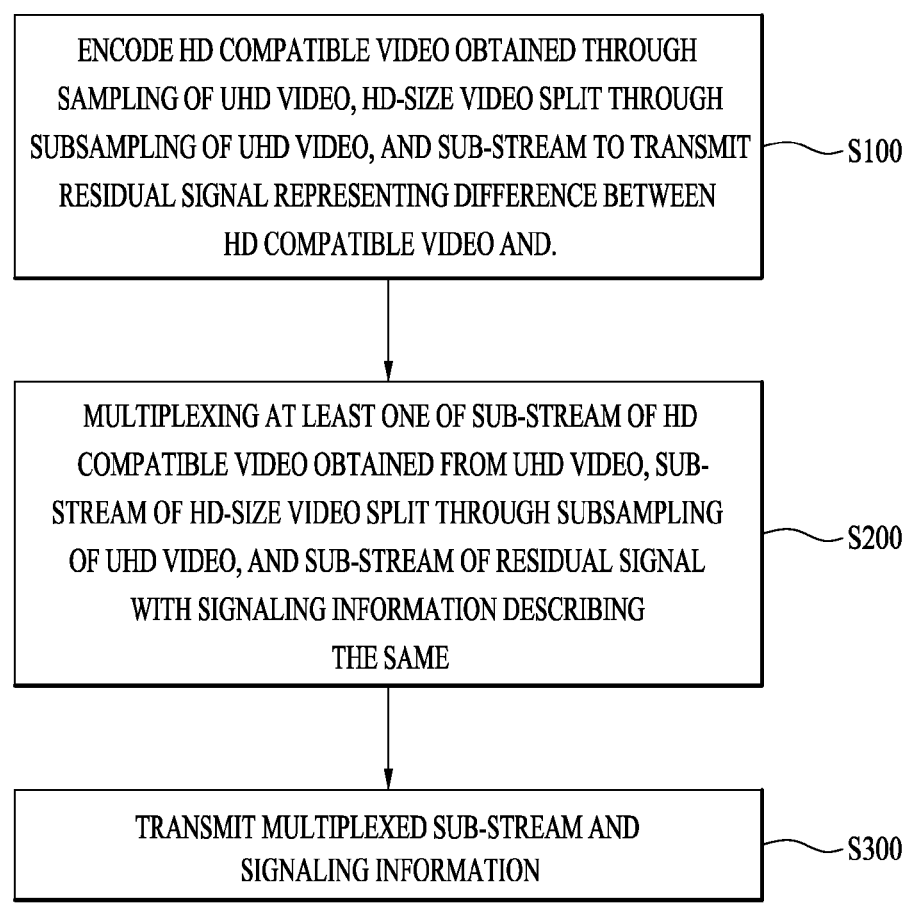
FIG. 20 is a view illustrating a video stream transmission method according to one embodiment of the present invention.

FIG. 20 is a view illustrating a video stream transmission method according to one embodiment of the present invention.

An HD compatible video obtained by sampling a UHD video, an HD-size video split from the UHD video through subsampling of the UHD video, and a sub-stream to transmit a residual signal representing the difference between the HD compatible video and the HD-size video are respectively encoded (S100).

FIG. 1 illustrates an embodiment of splitting the HD compatible video obtained by sampling the UHD video, the HD-size video split from the UHD video through subsampling of the UHD video, and residual signal representing the difference between the HD compatible video and the HD-size video.

At least one of the sub-stream of the HD compatible video obtained by sampling the UHD video, the sub-stream of the HD-size video split from the UHD video through subsampling of the UHD video, and the sub-stream of the residual signal is multiplexed with the signaling information describing the same (S200). The sub_stream_ID and stream_type as shown in FIG. 10 may be assigned to the signaling information in the multiplexed stream.

The multiplexed sub-stream and signaling information is transmitted (S300).

Figure 21:
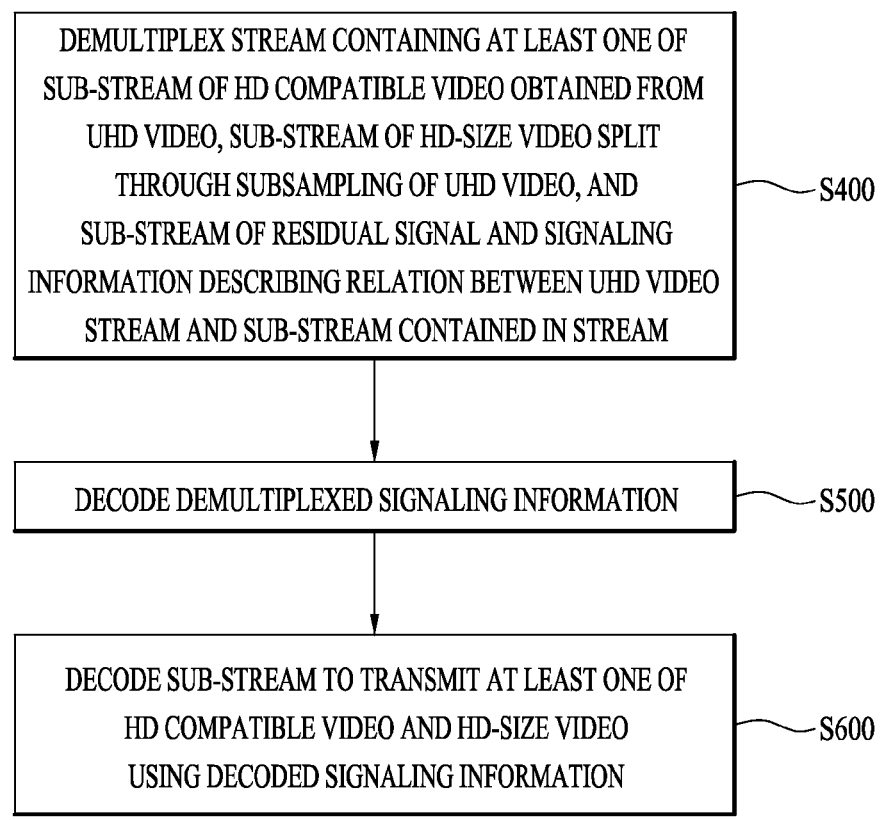
FIG. 21 is a view illustrating a video stream reception method according to one embodiment of the present invention.

FIG. 21 is a view illustrating a video stream reception method according to one embodiment of the present invention.

The stream containing at least one of the sub-stream of the HD compatible video obtained by sampling the UHD video, the sub-stream of the HD-size video split from the UHD video through subsampling of the UHD video, and the sub-stream of the residual signal, and the signaling information describing the relation between the UHD video stream and the sub-streams contained in the stream is demultiplexed (S400). FIGS. 6 and 10 illustrate an example of a stream to transmit sub-programs (services or channels) which can be contained in a program (service or channel).

The stream may be transmitted over a broadcast medium or an Internet transmission medium.

The signaling information obtained through demultiplexing is decoded (S500). The signaling information is illustrated in FIGS. 7 and 11. Each of the HD video sub-streams may contain the signaling information, which is illustrated in FIGS. 15 to 17.

Using the decoded signaling information, the sub-stream to transmit at least one of the HD compatible video and the HD-size video is decoded (S600). When at least one sub-stream is decoded, the UHD video stream may be expressed using the signaling information, or only the HD video stream may be expressed.

Embodiments of the Present Invention

Embodiments of the present invention are all disclosed above.

INDUSTRIAL APPLICABILITY

Embodiments of the present invention provide video stream transmitting and receiving devices/methods which allow efficient transmission and reception of an ultra high definition video stream, and is compatible with a current broadcast system, and thus they are available in the industry.

The invention claimed is:
1. A method for transmitting a video stream comprising the steps of:
downsampling, by an encoder, a High Efficiency Video (HEVC) stream carrying HEVC-encoded video data by an ultra-high definition (UHD)-to-HD down sampling process and outputting a sub-stream of a high definition (HD) compatible video and a sub-stream of residual data, wherein the HD compatible video is generated through the UHD-to-HD down sampling process, and wherein the residual data represents a difference between video data processed through the UHD-to-HD down sampling process and video data decimate-sampled from the HEVC-encoded video data;

encoding, by the encoder, the sub-stream of the HD compatible video and the sub-stream of the residual data, respectively;

multiplexing, by a multiplexer, signaling information describing the sub-streams; and transmitting, by a transmitter, the multiplexed sub-streams and the signaling information.

2. The method according to claim 1, wherein the signaling information comprises service type information indicating a service type provided with sub-streams.

3. The method according to claim 1, wherein the high definition (HD) compatible video is generated through a process of low pass filtering and down-sampling the HEVC-encoded video data.

4. The method according to claim 1, further comprising:
downsampling, by the encoder, the High Efficiency Video (HEVC) stream and outputting a plurality of sub-streams of HD-size videos,
wherein the HD-size video is generated through a process of sub-sampling the HEVC-encoded video data.

5. An apparatus for transmitting a video stream comprising:
an encoder:
to downsample a High Efficiency Video (HEVC) stream carrying HEVC-encoded video data by an ultra-high definition (UHD)-to-HD down sampling process,
to output a sub-stream of a high definition (HD) compatible video and a sub-stream of residual data,
wherein the HD compatible video is generated through the UHD-to-HD down sampling process, and
to encode, the sub-stream of the HD compatible video and the sub-stream of the residual data, respectively,
wherein the residual data represents a difference between video data processed through the UHD-to-HD down sampling process and video data decimate-sampled from the HEVC-encoded video data;
a multiplexer to multiplex signaling information describing the sub-streams; and
a transmitter to transmit the multiplexed sub-streams and the signaling information.

6. The apparatus according to claim 5, wherein the signaling information comprises service type information indicating a service type provided with sub-streams.

7. The apparatus according to claim 5, wherein the high definition (HD) compatible video is generated through a process of low pass filtering and down-sampling the HEVC-encoded video data.

8. The apparatus according to claim 5, wherein the encoder downsamples the High Efficiency Video (HEVC) stream outputs a plurality of sub-streams of HD-size videos, and wherein the HD-size video is generated through a process of sub-sampling the HEVC-encoded video data.

* * * * *